US012183565B2

(12) United States Patent
Green et al.

(10) Patent No.: US 12,183,565 B2
(45) Date of Patent: Dec. 31, 2024

(54) MASS FILTER HAVING REDUCED CONTAMINATION

(71) Applicant: Micromass UK Limited, Wilmslow (GB)

(72) Inventors: Martin Raymond Green, Bowdon (GB); David J. Langridge, Macclesfield (GB)

(73) Assignee: Micromass UK Limited, Wilmslow (GB)

( * ) Notice: Subject to any disclaimer, the term of this patent is extended or adjusted under 35 U.S.C. 154(b) by 298 days.

(21) Appl. No.: 17/613,708

(22) PCT Filed: May 6, 2020

(86) PCT No.: PCT/GB2020/051104
§ 371 (c)(1),
(2) Date: Nov. 23, 2021

(87) PCT Pub. No.: WO2020/240153
PCT Pub. Date: Dec. 3, 2020

(65) Prior Publication Data
US 2022/0230867 A1 Jul. 21, 2022

(30) Foreign Application Priority Data
May 24, 2019 (GB) ..................................... 1907332

(51) Int. Cl.
*H01J 49/42* (2006.01)
*H01J 49/00* (2006.01)

(52) U.S. Cl.
CPC ...... *H01J 49/4215* (2013.01); *H01J 49/0031* (2013.01)

(58) Field of Classification Search
CPC .. H01J 49/4215; H01J 49/0031; H01J 49/004; H01J 49/427
(Continued)

(56) References Cited

U.S. PATENT DOCUMENTS 6,093,929 A 7/2000 Javahery et al.
6,114,691 A 9/2000 Cousins
(Continued)

FOREIGN PATENT DOCUMENTS

CN 1653582 A 8/2005
CN 105097415 A 11/2015
(Continued)

OTHER PUBLICATIONS

Douglas, D.J., et al., "Quadrupolar Ion Excitation for Radiofrequency-Only Mass Filter Operation", European Journal of Mass Spectrometry 20(3): 207-214 (2014).
(Continued)

*Primary Examiner* — Kiet T Nguyen
(74) *Attorney, Agent, or Firm* — Goodwin Procter LLP

(57) ABSTRACT

A method of mass filtering ions is disclosed comprising: providing a first, AC-only, mass filter (2); providing a second mass filter (4) downstream of the first mass filter; applying a first AC voltage (8) to electrodes of the first mass filter so as to radially confine ions between the electrodes, and applying a second AC voltage (10) between electrodes of the first mass filter (2) so as to radially excite some of said ions such that these ions are not transmitted; and using the second mass filter (4) to mass filter ions; wherein at any given time the second mass filter (4) only transmits ions having a first range of mass to charge ratios and filters out all other ions; and wherein the step of applying the at least one second AC voltage (10) to electrodes of the first mass filter (2) radially excites ions such that at least some ions having mass to charge ratios above said first range are not transmitted into the second mass filter.

18 Claims, 3 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 7,211,788 B2 | 5/2007 | Marriott | |
| 11,062,895 B2 | 7/2021 | Peterson et al. | |
| 2002/0190201 A1 | 12/2002 | Yamanda et al. | |
| 2003/0113936 A1 | 6/2003 | Yamamoto | |
| 2004/0108456 A1 | 6/2004 | Sudakov et al. | |
| 2005/0067564 A1 | 3/2005 | Douglas et al. | |
| 2012/0305758 A1 | 12/2012 | Park | |
| 2018/0174817 A1* | 6/2018 | Green ................. | H01J 49/4215 |

FOREIGN PATENT DOCUMENTS

| | | | |
|---|---|---|---|
| CN | 105190831 | A | 12/2015 |
| CN | 107667414 | A | 2/2018 |
| EP | 2924712 | A1 | 9/2015 |
| EP | 3196640 | A1 | 7/2017 |
| EP | 3214638 | A1 | 9/2017 |
| GB | 2388705 | A | 11/2003 |
| GB | 2390222 | A | 12/2003 |
| GB | 2583092 | A | 10/2020 |
| JP | S59123155 | A | 7/1984 |
| WO | 9852209 | A1 | 11/1998 |
| WO | 2016193701 | A1 | 12/2016 |

OTHER PUBLICATIONS

Extrel CMS LLC 2014, “Using Graphical Tools to Understand Quadrupole Theory”, AZO Materials [online] [retrieved on Nov. 22, 2021]. Retrieved from Internet URL: https://www.azom.com/article/aspx?ArticleID=10996.

International Search Report for International application No. PCT/GB2020/051104, mailed on Sep. 24, 2020, 18 pages.

Konenkov, N.V., et al., “Quadrupole mass filter operation with auxiliary quadrupolar excitation: theory and experiment”, Inter Journal of Mass Spectrometry 208(1): 17-27 (2017).

Search and Examination Report under Sections 17 and 18(3) for GB2006678.3, dated Sep. 29, 2021, 9 pages.

Search Report under Section 17(5) for Application No. GB1907332.9, dated Nov. 22, 2019, 5 pages.

Makarov, A., et al., “Defying Gravity in Orbitrap Mass Spectrometry”, ASMS Presentation, Thermo Fisher Scientific, Bremen, Germany, Jun. 5, 2019.

* cited by examiner

MASS FILTER HAVING REDUCED CONTAMINATION

CROSS-REFERENCE TO RELATED APPLICATIONS

This application is a U.S. national phase filing claiming the benefit of and priority to International Patent Application No. PCT/GB2020/051104, filed on May 6, 2020, which claims priority from and the benefit of United Kingdom patent application No. 1907332.9, which was filed on May 24, 2019. The entire contents of these applications are incorporated herein by reference.

FIELD OF THE INVENTION

The present invention relates generally to mass and/or ion mobility spectrometers and in particular to mass filters that selectively transmit ions within a specific range of mass to charge ratios.

BACKGROUND

It is known to use quadrupole mass filters so as to selectively transmit ions within a specific range of mass to charge ratios. As is known in the art, a quadrupole mass filter transmits ions that satisfy conditions of stability within the quadrupole field, wherein the stability conditions are defined by the dimensionless parameters q and a:

$$q = \frac{4eV}{r_0^2\omega^2 m} \tag{1}$$

$$a = \frac{2eU}{r_0^2\omega^2 m} \tag{2}$$

where e is the charge of the ion, V is the amplitude of the RF voltage applied to the quadrupole electrodes, $r_0$ is the inscribed radius between the rods of the quadrupole, w is the angular frequency of the RF voltage applied to the quadrupole (in radians/sec), m is the mass of the ion, and U is the resolving DC voltage.

Ions having values of a and q that result in unstable ion trajectories generally impact on the rod electrodes of the quadrupole and are lost. This property is exploited when the quadrupole rod set is used as a mass filter, such that the majority of the ions that are not desired to be transmitted by the mass filter impact on the inner surfaces of the rod electrodes. However, over time the inner surfaces of the rods become contaminated by the ions and electronic charge builds up on their surfaces. Eventually, local charging of the contaminated surfaces results in degradation of performance of the mass filter. This may result in loss of transmission, loss of mass resolution or poor ion peak shapes in the ion signal from a downstream detector. If this occurs the mass filter must be removed from the vacuum chamber and cleaned.

U.S. Pat. No. 7,211,788 discloses providing a low resolution quadrupole mass filter upstream of a main analytical quadrupole in order to filter out a large proportion of the unwanted ions before they reach the main analytical quadrupole. Although this reduces the contamination of the main analytical quadrupole, the upstream low resolution quadrupole mass filter itself becomes contaminated relatively quickly and then suffers from the problems described above.

WO 2016/193701 discloses a quadrupole mass filter having apertures in the quadrupole rod electrodes so that filtered ions do not impact on the inner surfaces of the rod electrodes, thus reducing contamination and charge build-up in these regions.

SUMMARY

The present invention provides a method of mass filtering ions comprising: providing a first, AC-only, mass filter; providing a second mass filter downstream of the first mass filter; applying a first AC voltage to electrodes of the first mass filter so as to radially confine ions between the electrodes, and applying at least one second AC voltage between electrodes of the first mass filter so as to radially excite some of said ions such that these ions are not transmitted downstream into the second mass filter whereas other ions are transmitted downstream into the second mass filter; and using the second mass filter to mass filter ions transmitted by the first mass filter.

The inventors of the present invention have recognised that a relatively high concentration of contamination may build up in an mass filter (such as an analytical mass filter) relatively quickly due to the filtered ions striking the electrodes of the mass filter, and that providing the AC-only mass filter described herein upstream of the analytical mass filter reduces the rate at which contamination of the analytical mass filter occurs. Although the AC-only mass filter itself may become contaminated as it attenuates ions, the rate at which the concentration of contamination builds up in such a mass filter may be relatively low as the amplitude of oscillation of the ions increases relatively slowly due to the application of said at least one second AC voltage. Therefore, ions can travel up to a relatively long axial distance through the AC-only mass-filter before they strike the electrodes. The ion impact area in the AC-only mass filter, and hence the contamination thereof, may therefore be spread over an area that is relatively long in the axial direction. The use of an AC-only mass filter also enables embodiments that apply the at least one second AC voltage to the AC-only mass filter such that the filtered ions impact on all of its electrodes, thus spreading the contamination over a relatively large area. The use of an AC-only mass filter also enables embodiments that apply multiple second voltages having relative phases such that the transmission of undesired ions into the downstream analytical mass filter is attenuated or prevented.

Only AC voltages are applied to the first, AC-only mass filter. The first and/or second AC voltages may be RF voltages. No DC voltages are applied between the electrodes of the first, AC-only mass filter.

The step of applying at least one second AC voltage between electrodes of the first mass filter may radially excite ions having one or more mass to charge ratio such that at least some of these ions are not transmitted downstream into the second mass filter, whereas ions having other mass to charge ratios are transmitted downstream into the second mass filter.

The first mass filter and/or second mass filter may be a multipole mass filter, such as a quadrupole mass filter.

The rod electrodes of the first mass filter and/or second mass filter may have a circular cross-section, or may have radially inner surfaces that are hyperbolic.

Desirably, the cross-sectional shapes of the rod electrodes in the first mass filter match the cross-sectional shapes of the rod electrodes in the second mass filter.

The first mass filter may be directly upstream of and adjacent to the second mass filter.

The first mass filter may be a pre-filter for the second mass filter.

The first mass filter may control fringing fields at the entrance to the second mass filter so as to allow ions to enter the second mass filter substantially without becoming unstable.

The first mass filter may be shorter than the second mass filter.

In embodiments in which the first and second mass filters are multipole mass filters, the longitudinal axes of the rod electrodes of the first mass filter may be aligned with the longitudinal axes of the rod electrodes of the second mass filter.

At any given time, the first AC voltage applied to any one of the electrodes of the first mass filter may have the same frequency and phase as an RF voltage applied to the rod electrode of the second mass filter that is longitudinally adjacent to that electrode of the first mass filter (i.e. at the same circumferential position), but the electrode of the first mass filter may have a lower amplitude such as approximately only 50-90% of the amplitude.

Alternatively, the first AC voltage applied to any one of the electrodes of the first mass filter may be phase-locked to the RF voltage applied to the rod electrode of the second mass filter (that is longitudinally adjacent to that electrode of the first mass filter), wherein the frequency of the first AC voltage is an integer multiple (or the inverse of an integer multiple) of the frequency of said RF voltage. For example, the frequency of the first AC voltage may be 2×, 3×, ½, ⅓ etc. of the frequency of said RF voltage.

The second mass filter may be a resolving mass filter, wherein AC and DC voltages are applied between electrodes of the second mass filter.

The longitudinal axes of the rod electrodes of the first mass filter may be aligned with the longitudinal axes of the rod electrodes of the second mass filter. At any given time, the first AC voltage applied to any one of the electrodes of the first mass filter may have the same frequency and phase as the AC (e.g. RF) voltage applied to the rod electrode of the second mass filter that is longitudinally adjacent to that first mass filter electrode (i.e. at the same circumferential position).

The amplitude of the first AC voltage and/or the amplitude of the at least one second AC voltage may be less than the amplitude of the AC voltage applied to the second mass filter. This may reduce transmission losses on entry to the second mass filter due to fringe fields.

At any given time, the second mass filter may only transmit ions having a first range of mass to charge ratios and filters out all other ions. The step of applying the at least one second AC voltage to electrodes of the first mass filter may radially excite ions having one or more mass to charge ratio outside said first range of mass to charge ratios such that at least some ions having said one or more mass to charge ratio are not transmitted into the second mass filter.

The step of applying the at least one second AC voltage to electrodes of the first mass filter may radially excite ions such that at least some ions having mass to charge ratios above said first range are not transmitted into the second mass filter; and/or step of applying the at least one second AC voltage to electrodes of the first mass filter may radially excite ions such that at least some ions having mass to charge ratios below said first range are not transmitted into the second mass filter If the second mass filter is a quadrupole mass filter, when the second mass filter receives ions having mass to charge ratios above said first range then those ions will impact on only a single pair of electrodes in the second mass filter. Alternatively, if the second mass filter receives ions having mass to charge ratios below said first range then those ions will impact only on the other pair of electrodes in the second mass filter. Using the first mass filter to filter or attenuate some of these ions therefore reduces contamination of these electrodes in the second mass filter.

The first AC voltage applied to the first mass filter may cause the first mass filter to have a low-mass cut-off such that it only transmits ions above a threshold mass to charge ratio.

Ions having mass to charge ratios below this threshold may become unstable and impact on all rod electrodes of the first mass filter (if it is a multipole mass filter), and so it takes a relatively long time for the concentration of contamination and charging of the electrodes to become significant.

The step of applying at least one second AC voltage between electrodes of the first mass filter may comprise applying a first dipolar excitation waveform between a first pair of electrodes in the first mass filter.

The step of applying at least one second AC voltage to electrodes of the first mass filter may further comprise applying a second dipolar excitation waveform between a second different pair of electrodes in the first mass filter.

This may cause filtered ions to impact on a relatively large number of electrodes, thus providing a relatively large impact area and hence a relatively small rate at which the concentration of contamination builds up.

The first dipolar excitation waveform may have the same or different amplitude to the second dipolar excitation waveform.

The size of the amplitude difference may be varied with time, for example, in a scanned or stepped manner. This may be done to ensure that the undesired ions are distributed over a relatively large area.

The first dipolar excitation waveform may be less that 180 degrees, or more than 180 degrees, out of phase with the second dipolar excitation waveform.

For example, the first dipolar excitation waveform may be out of phase with the second dipolar excitation waveform by: between 10 and 170 degrees, between 20 and 160, between 30 and 150, between 40 and 140, between 50 and 130, between 60 and 120, between 70 and 110, between 80 and 100, or about 90 degrees.

The dipolar excitation waveform applied to the each of the first and second pair of electrodes may have multiple frequency components. In these embodiments, each frequency component may be out of phase.

The method may comprise varying the phase difference between the first dipolar excitation waveform and the second dipolar excitation waveform with time.

Varying the phase difference may help to ensure that the undesired ions are distributed over a relatively large area.

The first dipolar excitation waveform may be substantially in phase, or substantially 180 degrees out of phase, with the second dipolar excitation waveform.

When the dipoles are in phase or 180 degrees out of phase, the ion oscillates between the electrodes of the first mass filter in a region such that it is difficult for the ions to strike the electrodes. The ion may therefore travel up to a relatively long distance along the axial length of the first mass filter before hitting the electrodes, thus spreading the contamination over a relatively large area. Also, due to the location of the region in which the ions oscillates, the ions are likely to strike any given electrode at a location away from its radially inner surface. As such, the contamination of the electrodes occurs away from the inner surface and has less of an effect on the transmission properties of the first mass filter.

The first dipolar waveform may have the same frequency, or a different frequency, to the second dipolar waveform.

The dipolar excitation waveform applied to the each of the first and/or second pair of electrodes may have multiple frequency components.

For example, the excitation waveform may be a broad-band excitation waveform for filtering or attenuating a range of ions.

The first mass filter may be a quadrupole mass filter and each frequency component may be simultaneously applied to both pairs of opposing rod electrodes.

The step of applying the at least one second AC voltage to electrodes of the first mass filter so as to radially excite some of said ions may cause these ions to impact on electrodes of the first mass filter.

The step of applying at least one second AC voltage to electrodes of the first mass filter so as to radially excite some of said ions may cause ions to become located at radially outer positions such that their transmission into the second mass filter is attenuated or prevented by the electric fields between first and second mass filters.

The second mass filter may be a resolving mass filter, wherein a DC voltage is applied between electrodes of the second mass filter, and wherein the polarity of the DC voltage is reversed one or more times.

Reversing the polarity of the resolving DC voltage results in the reversal of the direction in which any given ion (having a mass to charge ratio that is outside of the mass transmission window of the resolving mass filter) becomes unstable. This may spread the ion impacts of unstable ions over a greater surfaces area of the mass filter electrodes.

The polarity may be reversed between different experiments, e.g. between each experiment, or may be reversed periodically (i.e. the first time it is operated after a predetermined period of time has elapsed). Alternatively, the polarity may be reversed each time that the mass filter has been operated for a predetermined period of time. Less preferably, the polarity may be reversed during a single experimental run/analysis, although it is preferred that the polarity is not reversed during a single experimental run/analysis.

The polarity may be reversed ≥1, ≥2, ≥3, ≥4, ≥5, ≥10, ≥15, ≥20, ≥25, ≥30, ≥40 or ≥50 times.

The spectrometer may be configured to automatically perform the switching of the polarity of the DC resolving voltage.

The tuning and/or mass calibration of the resolving mass filter may change when the polarity of the DC voltage is reversed. Therefore, the spectrometer may be configured to operate with a first set of operational parameters (e.g. voltages) when the polarity of the DC resolving voltage is in a first orientation and a second, different set of operational parameters (e.g. voltages) when the polarity of the DC resolving voltage is in a second orientation. Alternatively, or additionally, different mass to charge ratio calibrations may be determined and applied for each of the two polarity orientations.

An AC voltage may be applied between electrodes of the second mass filter.

The second mass filter may be a multipole, such as a quadrupole mass filter.

The present invention also provides a method of mass spectrometry comprising a method as claimed described herein, and comprising detecting ions transmitted by the second mass filter with an ion detector and determining the mass to charge ratio of the ions based on the voltages applied to the second mass filter at the times corresponding to that which the ions were transmitted by the second mass filter; and/or mass or mobility analysing ions transmitted by second mass filter.

The mass transmission window of the second mass filter may be scanned or stepped with time during the analysis of a sample.

The present invention also provides a mass spectrometer comprising: a first AC-only mass filter comprising a plurality of electrodes; a second mass filter arranged downstream of the first mass filter so as to receive ions transmitted by the first mass filter; one or more voltage supplies; and a control circuit configured to: control said one or more voltage supplies so as to apply a first AC voltage to electrodes of the first mass filter for radially confine ions between the electrodes, and apply at least one second AC voltage between electrodes of the first mass filter for radially exciting some of the ions such that these ions cannot be transmitted downstream into the second mass filter whereas other ions can be transmitted downstream into the second mass filter; and control said one or more voltage supplies so as to apply voltages to the second mass filter so that it mass filters the ions transmitted by the first mass filter.

The spectrometer may be set up and configured to perform any of the methods described herein.

The present invention also provides a method of mass filtering ions comprising: providing a mass filter; applying a DC resolving voltage between electrodes of the mass filter; and reversing the polarity of the DC resolving voltage one or more times.

The method may comprise mass filtering ions when the polarity of the DC resolving voltage is in a first orientation and mass filtering ions when the polarity of the DC resolving voltage is in a second orientation.

Reversing the polarity of the resolving DC voltage results in the reversal of the direction in which any given ion (having a mass to charge ratio that is outside of the mass transmission window of the resolving mass filter) becomes unstable. This may spread the ion impacts of unstable ions over a greater surfaces area of the mass filter electrodes. The polarity may be reversed between different experiments, e.g. between each experiment, or may be reversed periodically (i.e. the first time it is operated after a predetermined period of time has elapsed). Alternatively, the polarity may be reversed each time that the mass filter has been operated for a predetermined period of time. Less preferably, the polarity may be reversed during a single experimental run/analysis, although it is preferred that the polarity is not reversed during a single experimental run/analysis.

The polarity may be reversed ≥1, ≥2, ≥3, ≥4, ≥5, ≥10, ≥15, ≥20, ≥25, ≥30, ≥40 or ≥50 times.

The spectrometer may be configured to automatically perform the switching of the polarity of the DC resolving voltage.

The tuning and/or mass calibration of the mass filter may change when the polarity of the DC voltage is reversed. Therefore, the spectrometer may be configured to operate with a first set of operational parameters (e.g. voltages) when the polarity of the DC resolving voltage is in a first orientation and a second, different set of operational parameters (e.g. voltages) when the polarity of the DC resolving voltage is in a second orientation. Alternatively, or additionally, different mass to charge ratio calibrations may be determined and applied for each of the two polarity orientations.

An AC voltage may be applied between electrodes of the mass filter.

The mass filter may be a multipole, such as a quadrupole mass filter.

The present invention also provides a mass filter comprising: a plurality of electrodes; a DC voltage supply for applying a DC resolving voltage between electrodes of the mass filter; and a control circuit configured to reverse the polarity of the DC resolving voltage one or more times.

The present invention also provides a mass spectrometer comprising a mass filter as described above.

BRIEF DESCRIPTION OF THE DRAWINGS

Various embodiments of the present invention will now be described, by way of example only, and with reference to the accompanying drawings in which.

DETAILED DESCRIPTION

Figure 1:
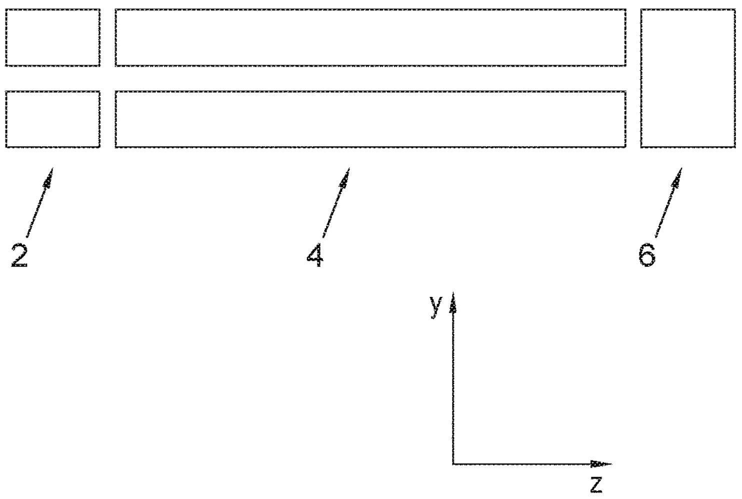
FIG. 1 shows a cross-sectional view of a schematic of a prior art instrument comprising a quadrupole pre-filter upstream of a main analytical quadrupole.

FIG. 1 shows a cross-sectional view (in the y-z plane) of a schematic of a prior art instrument comprising a short quadrupole pre-filter or Brubaker lens 2 positioned directly upstream of a main analytical quadrupole 4. Two opposing rod electrodes in the main analytical quadrupole are electrically connected to each other so as to form a first pair of electrodes, and the remaining two opposing rod electrodes are electrically connected to each other so as to form a second pair of electrodes. Both an RF voltage and a DC resolving voltage are applied between the two pairs of electrodes such that, at any given time, only ions having mass to charge ratios in a certain mass transmission window are able to be transmitted by the main analytical quadrupole 4. Ions having mass to charge ratios outside of this window are filtered out and do not reach the exit end of the main analytical quadrupole. The RF and DC voltages may be varied such that the mass to charge ratios capable of being transmitted by the main analytical quadrupole 4 vary. For example, the RF and DC voltages may be scanned or stepped with time such that the mass to charge ratios capable of being transmitted by the main analytical quadrupole 4 continuously or discontinuously vary with time. An ion detector 6 may be provided downstream of the main analytical quadrupole 4 for detecting ions transmitted by the main analytical quadrupole 4. If an ion is detected by the detector 6, the spectrometer may determine the mass to charge ratio of that ion based on the RF and DC voltages applied to the rod electrodes of the main analytical quadrupole 4 at the time corresponding to the time which the ion was transmitted by the main analytical quadrupole (since the RF and DC voltages determine the mass to charge ratios that are capable of being transmitted).

The pre-filter 2 is an RF-only quadrupole rod set that is only supplied with an RF voltage (and is not supplied with a DC voltage). The purpose of the pre-filter 2 is to control fringing fields at the entrance to the main resolving quadrupole 4 so as to allow ions to enter the RF-confined environment without becoming unstable and without initially experiencing the effects of the resolving DC applied to the main analytical quadrupole mass filter 4. The longitudinal axes of the rod electrodes of the pre-filter 2 may be aligned with the longitudinal axes of the rod electrodes of the main analytical quadrupole 4. At any given time, the RF voltage applied to any one of the pre-filter electrodes may have the same frequency and phase as the RF voltage applied to the rod electrode of the main analytical quadrupole 4 that is longitudinally adjacent to that pre-filter electrode (i.e. at the same circumferential position), but approximately only 50-90% of the amplitude.

Ions having values of the dimensionless parameters a and q which result in unstable ion trajectories through the main analytical quadrupole 4 generally impact on the rod electrodes of that quadrupole 4 and are lost. This property is exploited when the quadrupole rod set is used as a mass filter, such that the majority of the ions that are not desired to be transmitted by the main analytical quadrupole 4 impact on the inner surfaces of the rod electrodes. However, over time the inner surfaces of the rod electrodes become contaminated by the ions and electronic charge builds up on their surfaces. Eventually, local charging of the contaminated surfaces results in degradation of performance of the main analytical quadrupole 4. This may result in loss of transmission, loss of mass resolution or poor peak shape of the ion signal from the downstream detector 6. The contamination may occur particularly rapidly when using quadrupole mass filters with efficient ionisation sources and complex, highly concentrated matrices. If such contamination occurs then the main analytical quadrupole 4 must be removed from the vacuum chamber and cleaned.

The inventors have observed that the contamination is often localised to a relatively small area on the radially inner surfaces of only a single pair of the quadrupole rod electrodes of the main analytical quadrupole 4. For example, the majority of the contamination may occur within the first 5 mm from the entrance of the main analytical quadrupole 4 (measured along the longitudinal direction of the main analytical quadrupole). Generally, the majority of the contamination is caused by ions having mass to charge ratios above the transmission window of the main analytical quadrupole 4, which become unstable towards a specific pair of rod electrodes.

As described above, the RF-only pre-filter 2 is used before the main analytical quadrupole 4 in order to improve transmission of ions into the main analytical quadrupole 4. However, the pre-filter 2 does inherently have a low-mass cut off such that it only transmits ions above a threshold mass to charge ratio. Ions having mass to charge ratios below this threshold become unstable and impact on all four rod electrodes (instability occurs evenly in both x and y directions), and so it takes a relatively long time for the concentration of contamination and charging of the electrodes to become significant. The RF voltage on the pre-filter 2 may be set to approximately 67% of the amplitude of the main quadrupole 4. Therefore, for a main analytical quadrupole 4 having a mass transmission window set to transmit an ion mass of 600 amu, the pre-filter 2 will have a low-mass cut-off value of approximately 313 amu. Ions having masses lower than 313 amu do not therefore reach the main analytical quadrupole 4 and so are not filtered by the main analytical quadrupole 4. The presence of the pre-filter 2 therefore mitigates, to some extent, contamination of the main analytical quadrupole 4 due to low mass ions. However, the pre-filter 2 does little to protect the main analytical quadrupole 4 from contamination due to ions having mass to charge ratios above the inherent low-mass cut-off of the pre-filter 2.

As described above, U.S. Pat. No. 7,211,788 discloses providing a low resolution quadrupole mass filter upstream of a main analytical quadrupole in order to filter out a large proportion of the unwanted ions before they reach the main analytical quadrupole. In other words, unlike the RF-only pre-filter 2 described above, in U.S. Pat. No. 7,211,788 both an RF and DC voltage are applied to the quadrupole upstream of the main analytical quadrupole in order to deliberately filter out unwanted ions and reduce contamination of the main analytical quadrupole. However, although this technique reduces the contamination of the main analytical quadrupole, the upstream low resolution quadrupole mass filter itself becomes contaminated relatively quickly and then suffers from the problems described above.

The inventors of the present invention have recognised that a relatively high concentration of contamination builds up in parts of a resolving quadrupole mass filter relatively quickly, partly because the unstable ions to be filtered impact on the rod electrodes over a relatively short length in resolving quadrupole mass filters. Also, in resolving quadrupole mass filters, unstable ions having mass to charge ratios above the mass transmission window of the filter will impact on a single pair of the rod electrodes, and unstable ions having mass to charge ratios below the mass transmission window will impact on the other pair of the rod electrodes. If the proportion of the ions transmitted into the mass filter that are above the mass transmission window is greater than the proportion of the ions transmitted into the mass filter that are below the mass transmission window, then the concentration of contamination will build up more quickly on one of the pairs of electrodes.

Embodiments of the present invention provide an AC-only (e.g. RF-only) quadrupole mass filter (a first mass filter) upstream of the main analytical quadrupole (a second mass filter), wherein a first AC voltage is applied to electrodes of the AC-only mass filter so as to radially confine ions and at least one second AC voltage is applied between electrodes of the AC-only mass filter so as to filter ions or attenuate the intensity of certain ions transmitted downstream into the main analytical quadrupole. For example, ions having mass to charge ratios above the transmission window of the main analytical quadrupole may be excited in the AC-only quadrupole so that their transmission to the main analytical quadrupole is attenuated or eliminated. Therefore, the AC-only quadrupole according to the embodiments of the present invention is able to filter out or attenuate ions of selected mass to charge ratio(s), in addition to the inherent filtering out of ions having mass to charge ratios that are below the low-mass cut-off of the AC-only quadrupole. The AC-only mass filter may be a pre-filter arranged directly upstream of the main analytical quadrupole, or there may be another pre-filter between the AC-only mass filter and the main analytical quadrupole.

Figure 2:
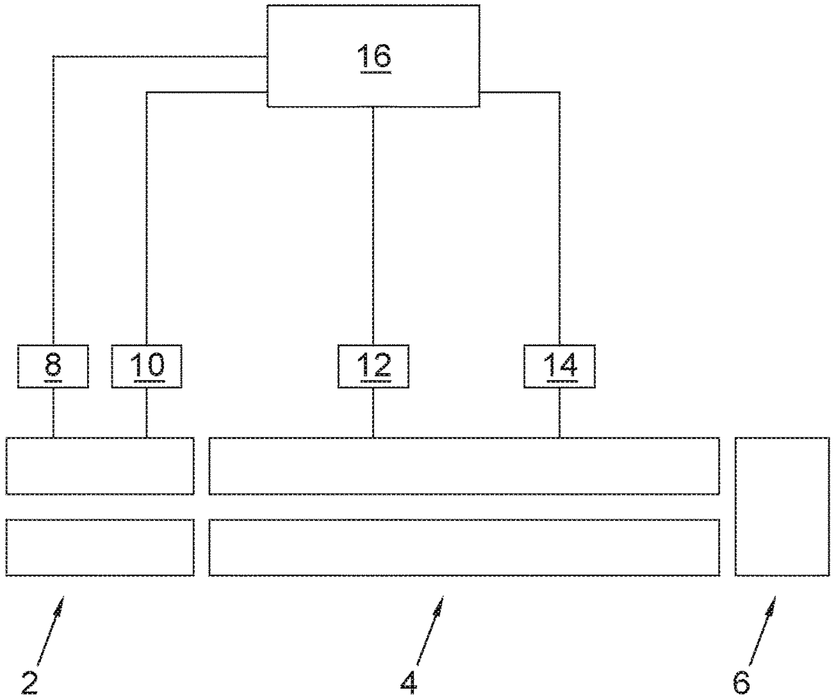
FIG. 2 shows a cross-sectional view of a schematic of an instrument according to an embodiment the present invention.

FIG. 2 shows a cross-sectional view of a schematic of an instrument according to an embodiment the present invention. The instrument is similar to that shown in FIG. 1, except that the RF-only pre-filter 2 is an AC-only mass filter, to which an additional AC voltage is applied for attenuating or eliminating the transmission of ions having certain mass to charge ratios to the main analytical quadrupole 4. Therefore, as with a conventional RF-only pre-filter, the longitudinal axes of the rod electrodes of the AC-only mass filter 2 may be aligned with the longitudinal axes of the rod electrodes of the main analytical quadrupole mass filter 4. A first AC voltage supply 8 supplies a first AC voltage to electrodes of the AC-only mass filter 2 so as to radially confine ions. At any given time, the first AC voltage applied to any one of the electrodes of the AC-only mass filter may have the same frequency and phase (but different, e.g. reduced, amplitude), as the RF voltage applied to the rod electrode of the main analytical quadrupole 4 that is longitudinally adjacent to that AC-only mass filter electrode (i.e. at the same circumferential position). However, according to the embodiments of the present invention, a second AC (e.g. RF) voltage supply 10 is connected to the rod electrodes of the AC-only mass filter 2 for supplying a different AC voltage between the rod electrodes in order to attenuate or eliminate the transmission of certain ions into the main analytical quadrupole 4. A DC voltage is not applied to the AC-only mass filter.

An RF voltage supply 12 and a DC voltage 14 supply apply RF and DC voltages, respectively, to the electrodes of the main analytical quadrupole mass filter 4 such that the main analytical quadrupole mass filter 4 is only capable of transmitting ions having a certain range of mass to charge ratios (at any given time). A controller 16 is provided so as to control the above described voltage supplies.

In operation, the AC voltage supply 8 applies a first AC voltage to the electrodes of the AC-only mass filter 2 for radially confining ions such that they can be transmitted towards the main analytical quadrupole 4. The first AC voltage applied to the AC-only mass filter 2 may be of lower amplitude than the RF voltage applied to the main analytical quadrupole 4 so as to reduce transmission losses on entry to the main analytical quadrupole 4 due to fringe fields. The second AC voltage supply 10 may apply at least one second AC voltage between electrodes of the AC-only mass filter 2 so as to radially excite some of the ions such that they impact on the rod electrodes of the AC-only mass filter 2. For example, the second AC voltage may be applied between one or more pair of electrodes (for example, between at least one pair of opposing electrodes) such that ions are radially excited to impact the electrodes. The second AC voltage may therefore be one or more dipole waveform. Alternatively, or additionally, the second AC voltage may be applied to the electrodes of the AC-only mass filter 2 so as to cause ions to become located at radially outer positions such that their transmission into the main analytical quadrupole 4 is attenuated or prevented by the fringe fields between the quadrupoles 2,4. The second AC voltage may be applied such that at least some ions having mass to charge ratios above a threshold value (which would otherwise be transmitted by the AC-only mass filter 2) are attenuated or eliminated by the AC-only mass filter 2.

Ions having a first range of mass to charge ratios are thus transmitted into the main analytical mass filter 4. The RF and DC voltages applied to main analytical mass filter 4 cause only ions in a second, narrower range of mass to charge ratios (i.e. in a mass transmission window) to be radially confined and hence transmitted to the exit of the main analytical mass filter 4. Ions having mass to charge ratios outside of this second range are filtered out by the main analytical mass filter 4, for example, by being radially excited into the electrodes of the main analytical mass filter 4. These ions are not transmitted to the exit of the main analytical mass filter 4. The provision of the AC-only mass filter 2 enables some ions having mass to charge ratios outside of the second range of mass to charge ratios to be filtered out upstream of the main analytical filter 4. As such, these ions are not required to be filtered out by the main analytical filter 4 and hence do not impact on the electrodes of the main analytical filter 4. This helps avoid contamination of the main analytical filter 4 and reduces surface charging of the main analytical filter 4, which would degrade its ion transmission properties.

It has been recognized that ions having mass to charge ratios above the second range of mass to charge ratios are particularly problematic and the pre-filter according to embodiments described herein may filter out at least some of these ions upstream of the main analytical filter 4.

Ions in the second range of mass to charge ratios that are transmitted by the main mass filter 4 may be transmitted downstream to an ion detector 6. If an ion is detected by the detector 6, the spectrometer may determine the mass to charge ratio of that ion based on the RF and DC voltages applied to the main analytical quadrupole 4 at the time corresponding to that which the ion was transmitted by the main analytical quadrupole 4 (since the RF and DC voltages determine the mass to charge ratios that are capable of being transmitted). The main analytical quadrupole 4 may therefore form part of a mass analyser. The mass transmission window of the main analytical quadrupole 4 may be scanned or stepped with time during the analysis of a sample. The second AC voltage applied to the AC-only mass filter 2 may be scanned or stepped in synchronism with the scanning or stepping of the main analytical quadrupole 4.

As described above, the AC-only mass filter 2 may filter out ions by causing them to hit electrodes of the AC-only mass filter 2, which will cause contamination of these electrodes. To reduce the rate at which the concentration of such contamination builds up, the surface area of the electrodes over which the unstable ions impact may be maximised.

Embodiments contemplate applying the second AC voltage between only two electrodes in the AC-only mass filter 2, for example, by applying a dipole excitation waveform to a single rod pair. This directs ions of a particular secular frequency (or frequencies if a broad-band waveform is applied) towards only a single rod pair. However, the rate at which the concentration of contamination builds up in such an AC-only mass filter 2 may still be reduced relative to a resolving quadrupole mass filter. In a resolving quadrupole mass filter (in which both a DC and RF voltage is applied), the filtered ions also impact on only a single pair of electrodes. However, in such devices the ions to be filtered become unstable relatively quickly and so contamination occurs over a short axial length of the device. In contrast, in an AC-only mass filter 2 the ions are radially oscillated by the RF field many times until they strike the electrodes. As such, the ions to be filtered can travel up to a relatively long axial distance through the AC-only mass filter 2 before they strike the electrodes. The ion impact area may therefore be spread over an area that is relatively long in the axial direction, as compared to in a resolving quadrupole.

In order to further increase the area over which filtered ions impact on the electrodes of the AC-only mass filter 2, the second AC dipole excitation waveform may be applied as a first dipole excitation between a first pair of rod electrodes, and a second dipole excitation between a second pair of rod electrodes. This may cause filtered ions to impact on all four of the rod electrodes, thus providing a relatively large impact area and hence a relatively small rate at which the concentration of contamination builds up.

FIGS. 3A-3D show SIMION® models of ion trajectories for unstable ions within an AC-only mass filter 2 when the second AC voltage applies different dipole excitation fields to the rod electrodes. The second AC voltage has the same frequency in all of the models.

Figure 3A:
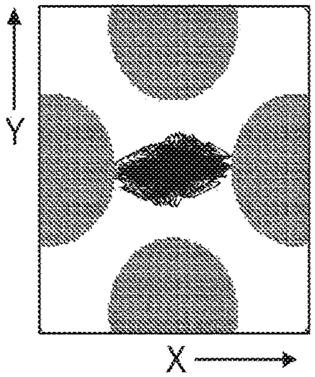
FIGS. 3A-3D show SIMION® models of ion trajectories for unstable ions within AC-only mass filters according to embodiments the present invention.

FIG. 3A shows the ion trajectories for unstable ions when the second AC voltage is a single dipole that is applied only between the electrodes that oppose each other in the X-dimension. As can be seen, the ions radially oscillate between the electrodes in the X-dimension until they strike the inner surfaces of the electrodes over a relatively small area.

Figure 3B:
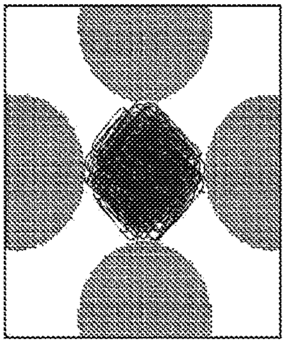

FIG. 3B shows the ion trajectories for unstable ions when the second AC voltage is a first dipole applied between the electrodes that oppose each other in the X-dimension, and also a second dipole applied between the electrodes that oppose each other in the Y-dimension, wherein the first and second dipoles have the same frequency but are 90 degrees out of phase. As can be seen, the ions radially oscillate between the electrodes in the X- and Y-dimensions until they strike the inner surfaces of the electrodes over a relatively large area.

Figure 3C:
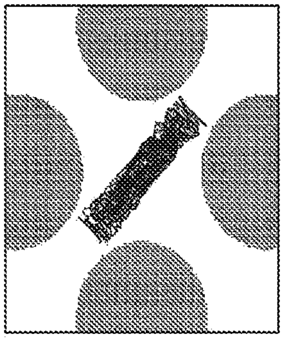
Figure 3D:
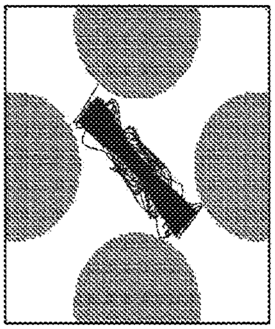

FIGS. 3C and 3D each show the ion trajectory for a single unstable ion when the second AC voltage is a first dipole applied between the electrodes that oppose each other in the X-dimension, and also a second dipole applied between the electrodes that oppose each other in the Y-dimension, wherein the first and second dipoles have the same frequency but are in phase (FIG. 3C) and 180 degrees out of phase (FIG. 3D). As can be seen, the ion oscillates between the electrodes in a region such that it is difficult for the ion to strike the electrodes. The ion may therefore travel up to a relatively long distance along the axial length of the AC-only mass filter 2 before hitting the electrodes, thus spreading the contamination over a relatively large area. Also, due to the location of the region in which the ion oscillates, the ion is likely to strike any given electrode at a location away from its radially inner surface. As such, the contamination of the electrodes occurs away from the inner surface and has less of an effect on the transmission properties of the AC-only mass filter 2.

It is contemplated that the second AC voltage may not cause ions to strike the electrodes of the AC-only mass filter 2, but that it may move the ions to radial positions such that the ions cannot be accepted into the main analytical quadrupole 4, for example, due to the quadrupole fringe fields arranged therebetween. For example, it has been found that the difference in amplitude between the first AC voltage applied to the AC-only mass filter 2 and the RF applied to the main resolving quadrupole 4 creates a field which can cause ions to become unstable once they are disturbed from the central axis of the mass analyser by application of the second AC voltage. In this case the undesired ions are not necessarily excited to the point where they hit the rod electrodes, but rather their entrance conditions to the main analytical quadrupole 4 may be perturbed such that these ions are lost to other surfaces.

Figure 4:
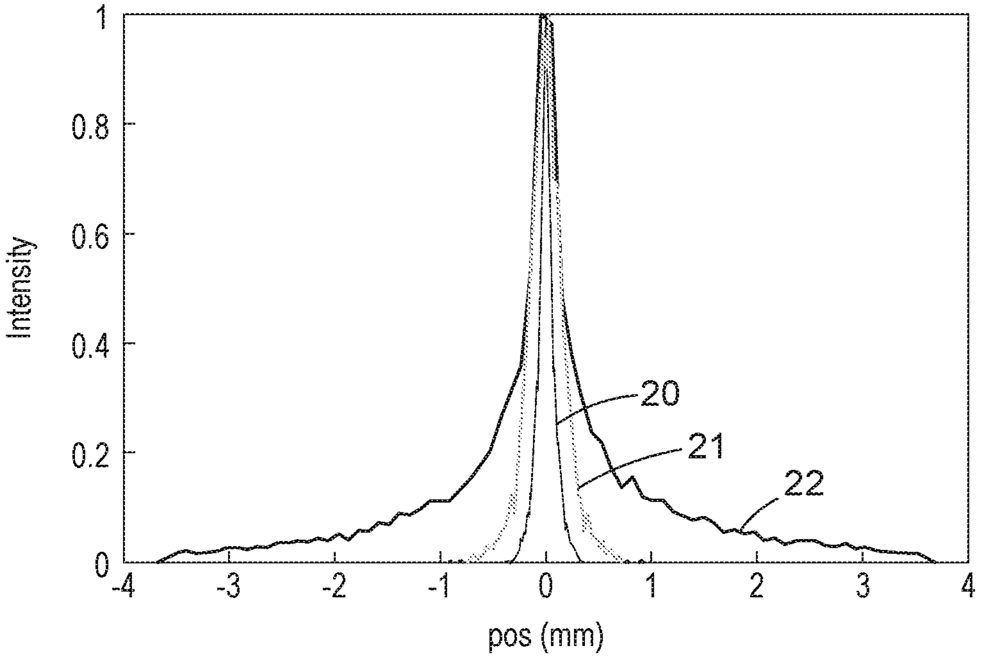
FIG. 4 shows models of the intensities of ions striking various electrodes of an pre-filter or main analytical quadrupole according to FIG. 1.
Figure 5:
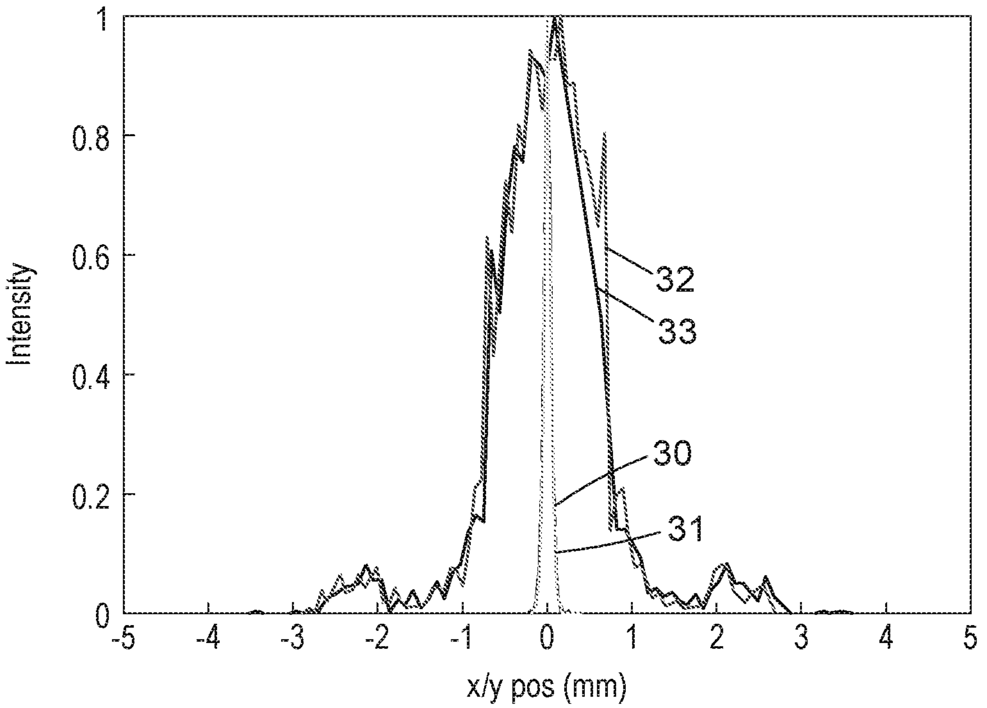
FIG. 5 shows models of the intensities of ions striking various electrodes of an AC-only mass filter or main analytical quadrupole according to embodiments the present invention.

FIGS. 4 and 5 show models that illustrate how embodiments of the present invention are improved over the conventional arrangement described above with respect to FIG. 1.

FIG. 4 shows three models of the intensities of ions striking various electrodes of the pre-filter 2 or main analytical quadrupole 4 in FIG. 1, as a function of position on those electrodes. The y-axis that is labeled intensity is the relative number of ions that strike the electrodes. The x-axis represents the positions on the electrodes that the ions strike. In the models used, the filter 2 and main analytical mass filter 4 had an internal radius of 5.33 mm, the main drive RF voltage had a frequency of 1.185 MHz and the first AC voltage amplitude applied to the filter 2 was set to 67% of the RF amplitude applied to the main analytical quadrupole 4. Data 20 shows how filtered ions of m/z=556 impact on electrodes of the main analytical quadrupole 4 when it is set to transmit ions having m/z=500. These filtered ions impact on the rod electrodes that are opposite each other in the Y-dimension. As can be seen, the majority of the filtered ions impact each of these two electrodes over a relatively small area. Data 21 shows how filtered ions of m/z=556 impact on electrodes of the main analytical quadrupole when it is set to transmit ions having m/z=600. These filtered ions impact on the rod electrodes that are opposite each other in the X-dimension. As can be seen, the majority of the filtered ions impact each of these two electrodes over a relatively small area. Data 22 shows how filtered ions of m/z=100 impact on electrodes of the filter 2 when it is set to transmit ions having m/z=600 (q=2.83 in the pre-filter for these ions, 0.706*0.67*6). These filtered ions impact on all of the rod electrodes. As can be seen, the filtered ions impact the electrodes over a relatively large area. Approximately 45% of the ion beam strikes each filter 2 rod pair with the distribution shown, and the remaining 10% pass between the rods of the filter 2.

FIG. 5 shows four plots of the intensities of ions striking various electrodes of AC-only mass filters 2 according to embodiments of the present invention, as a function of position on those electrodes. The plots were modeled using the same operational parameters of the AC-only mass filter 2 as in FIG. 4, except with a second AC voltage applying various different dipole excitation waveforms in each model. In the models of FIG. 5, the ions have m/z=556, q=0.4 and so beta=0.293, the second AC voltage dipole excitation frequency is 173 kHz (for 1.185 MHz main RF) and has a 5 V amplitude (0-peak).

Plot 30 shows how the filtered ions impact on electrodes when a dipole excitation waveform is applied only between rod electrodes that are opposite each other in the X-dimension (such as in FIG. 3A). Plot 31 shows how the filtered ions impact on electrodes when a dipole is applied only between rod electrodes that are opposite each other in the Y-dimension. As can be seen, in each of these plots, the filtered ions impact each of the two electrodes over a relatively small area.

The filtering of ions was also modeled when a first dipole is applied between rod electrodes that are opposite each other in the X-dimension and a second dipole is applied between rod electrodes that are opposite each other in the Y-dimension, wherein the first and second dipoles are 90 degrees out of phase (such as in FIG. 3B). Plot 32 shows how the filtered ions impact on the electrodes that are opposite each other in the X-dimension, and plot 33 shows how the filtered ions impact on the electrodes that are opposite each other in the Y-dimension. As can be seen, in each of these plots, the filtered ions impact the electrodes over a relatively large area. Therefore, it can be seen that using two dipole excitation waveforms of the same frequency but 90 degrees out of phase on the two rod pairs results in unwanted ions hitting the electrodes over a large surface area.

Although first and second dipoles that are 90 degrees out of phase have been described, embodiments are also contemplated in which the dipoles are out of phase by different amounts, or are in phase. For example, the two waveforms may be in phase (such as in FIG. 3C) or 180 degrees out of phase (such as in FIG. 3D). These embodiments may result in the ions radially oscillating between the rods with an increased amplitude. Most ions may become unstable in a relatively narrow region between the rods. However, as this region is further away from the centre of the ion guide this arrangement may still lead to an extension of the usable time before cleaning is required.

It is contemplated that the phase difference between the dipoles may be varied with time, for example, in a scanned or stepped manner. The phase difference may be varied periodically. Varying the phase difference may help to ensure that the undesired ions are distributed over a relatively large area.

In embodiments wherein a first dipole is applied between a first pair of rod electrodes and a second dipole is applied between a second pair of rod electrodes, the dipoles may have the same or different amplitudes. The size of the amplitude difference may be varied with time, for example, in a scanned or stepped manner. This may be done to ensure that the undesired ions are distributed over a relatively large area.

As described above, the second AC voltage supply 10 applies one or more AC voltage to the AC-only mass filter 2 so as to attenuate or filter out ions having mass to charge ratios above the low-mass cut-off of the AC-only mass filter 2. The second AC voltage supply 10 may apply one or more AC voltage between electrodes of the AC-only mass filter 2 so as to attenuate or filter out ions having mass to charge ratios above and/or below the mass transmission window of the main analytical quadrupole 4. The filtering or attenuation may be up to 100% for ions of at least some mass to charge ratio values.

As described above, the inventors of the present invention have recognised that a relatively high concentration of contamination builds up in parts of a resolving quadrupole mass filter relatively quickly. In a resolving quadrupole mass filter, one polarity of a DC voltage supply is supplied to a first pair of the rod electrodes and another polarity of the DC voltage supply is supplied to the other pair of rod electrodes, such that the DC voltage is applied between the pairs of rod electrodes. This causes unstable ions having mass to charge ratios above the mass transmission window of the resolving quadrupole mass filter to impact on a single pair of the rod electrodes, and unstable ions having mass to charge ratios below the mass transmission window to impact on the other pair of the rod electrodes. If the proportion of the ions transmitted into the mass filter that are above the mass transmission window is greater than the proportion of the ions transmitted into the mass filter that are below the mass transmission window, or vice versa, then the concentration of contamination will build up more quickly on one of the pairs of electrodes.

In order to mitigate this problem, embodiments reverse the polarity of the DC voltage applied between the pairs of rod electrodes. Reversing the polarity of the resolving DC voltage results in the reversal of the direction in which ions having lower and higher mass to charge ratios than the mass transmission window become unstable. This may spread the ion impacts of unstable ions over the surfaces of both pairs of rod electrodes more evenly and may therefore extend the time before surface contamination and surface charging causes a degradation of analytical performance.

The polarity may be reversed one or more times. The polarity may be reversed between different experiments, e.g. between each experiment, or may be reversed periodically (i.e. the first time it is operated after a predetermined period of time has elapsed). For example, the polarity may be reversed once a week or once a month. Alternatively, the polarity may be reversed each time that the DC resolving mass filter 4 has been operated for a predetermined period of time. Less preferably, the polarity may be reversed during a single experimental run/analysis, although it is preferred that the polarity is not reversed during a single experimental run/analysis.

Switching the polarity of the DC resolving voltage may significantly extend the period before the performance of the mass filter 4 degrades, e.g. by a factor of 2. For example, the time before the mass filter 4 requires significant maintenance may be extended from one year to two years, resulting in a significantly improved customer experience. However, as any charging of the electrode surface may be more evenly distributed, the gain in lifetime may be even greater.

The spectrometer may be configured to automatically perform the switching of the polarity of the DC resolving voltage.

The tuning and/or mass calibration of the quadrupole mass filter 4 may change when the polarity of the DC voltage is reversed. Therefore, the spectrometer may be configured to operate with a first set of operational parameters (e.g. voltages) when the polarity of the DC resolving voltage is in a first orientation and a second, different set of operational parameters (e.g. voltages) when the polarity of the DC resolving voltage is in a second orientation. Alternatively, or additionally, different mass to charge ratio calibrations may be determined and applied for each of the two polarity orientations.

The technique of switching the polarity of the DC resolving voltage may be used with or without the AC-only mass filter 2 described herein.

Although the present invention has been described with reference to preferred embodiments, it will be understood by those skilled in the art that various changes in form and detail may be made without departing from the scope of the invention as set forth in the accompanying claims.

For example, although the second AC voltage supply has been described as applying one or more dipole waveform to the rod electrodes of the AC-only mass filter 2, the second AC voltage supply may apply a quadrupolar excitation field to the electrodes, for example, to attenuate higher mass to charge ratio ions.

Although quadrupole rod sets have been described herein, it is contemplated that the AC-only mass filter 2 and/or main analytical filter 4 may alternatively be a multipole other than a quadrupole rod set. For example, the pre-filter and/or main analytical filter may be a hexapole or an octopole rod set.

The invention claimed is:

1. A method of mass filtering ions comprising:

providing a first, AC-only, mass filter;

providing a second mass filter downstream of the first mass filter;

applying a first AC voltage to electrodes of the first mass filter so as to radially confine ions between the electrodes, and applying at least one second AC voltage between electrodes of the first mass filter so as to radially excite some of said ions such that these ions are not transmitted downstream into the second mass filter whereas other ions are transmitted downstream into the second mass filter; and using the second mass filter to mass filter ions transmitted by the first mass filter;

wherein at any given time the second mass filter only transmits ions having a first range of mass to charge ratios and filters out all other ions; and wherein the step of applying the at least one second AC voltage to electrodes of the first mass filter radially excites ions such that at least some ions having mass to charge ratios above said first range are not transmitted into the second mass filter.

2. The method of claim 1, wherein the first mass filter and/or second mass filter is a multipole mass filter, such as a quadrupole mass filter.

3. The method of claim 1, wherein the first mass filter is directly upstream of and adjacent to the second mass filter.

4. The method of claim 1, wherein the second mass filter is a resolving mass filter, and wherein AC and DC voltages are applied between electrodes of the second mass filter.

5. The method of claim 4, wherein the amplitude of the first AC voltage and/or the amplitude of the at least one second AC voltage is less than the amplitude of the AC voltage applied to the second mass filter.

6. The method of claim 1, wherein the step of applying the at least one second AC voltage to electrodes of the first mass filter radially excites ions such that at least some ions having mass to charge ratios below said first range are not transmitted into the second mass filter.

7. The method of claim 1, wherein the first AC voltage applied to the first mass filter causes the first mass filter to have a low-mass cut-off such that it only transmits ions above a threshold mass to charge ratio.

8. The method of claim 1, wherein the step of applying at least one second AC voltage between electrodes of the first mass filter comprises applying a first dipolar excitation waveform between a first pair of electrodes in the first mass filter.

9. The method of claim 8, wherein the step of applying at least one second AC voltage to electrodes of the first mass filter further comprises applying a second dipolar excitation waveform between a second different pair of electrodes in the first mass filter.

10. The method of claim 9, wherein the first dipolar excitation waveform is less that 180 degrees or more than 180 degrees out of phase with the second dipolar excitation waveform.

11. The method of claim 9, comprising varying a phase difference between the first dipolar excitation waveform and the second dipolar excitation waveform with time.

12. The method of claim 9, wherein the first dipolar excitation waveform is substantially in phase, or substantially 180 degrees out of phase, with the second dipolar excitation waveform.

13. The method of claim 8, wherein the first dipolar excitation waveform applied to the first pair of electrodes has multiple frequency components.

14. The method of claim 1, wherein the step of applying the at least one second AC voltage to electrodes of the first mass filter so as to radially excite some of said ions causes these ions to impact on electrodes of the first mass filter.

15. The method of claim 1, wherein the step of applying at least one second AC voltage to electrodes of the first mass filter so as to radially excite some of said ions causes ions to become located at radially outer positions such that their transmission into the second mass filter is attenuated or prevented by the electric fields between first and second mass filters.

16. The method of claim 1, wherein the second mass filter is a resolving mass filter, wherein a DC voltage is applied between electrodes of the second mass filter, and wherein the polarity of the DC voltage is reversed one or more times.

17. A method of mass spectrometry comprising a method as claimed in claim 1, and comprising detecting ions transmitted by the second mass filter with an ion detector and determining the mass to charge ratio of the ions based on the voltages applied to the second mass filter at the times corresponding to that which the ions were transmitted by the second mass filter; and/or mass or mobility analysing ions transmitted by second mass filter.

18. A mass spectrometer comprising:

a first AC-only mass filter comprising a plurality of electrodes;

a second mass filter arranged downstream of the first mass filter so as to receive ions transmitted by the first mass filter;

one or more voltage supplies; and a control circuit configured to:

control said one or more voltage supplies so as to apply a first AC voltage to electrodes of the first mass filter for radially confine ions between the electrodes, and apply at least one second AC voltage between electrodes of the first mass filter for radially exciting some of the ions such that these ions cannot be transmitted downstream into the second mass filter whereas other ions can be transmitted downstream into the second mass filter; and control said one or more voltage supplies so as to apply voltages to the second mass filter so that it mass filters the ions transmitted by the first mass filter; wherein at any given time the second mass filter only transmits ions having a first range of mass to charge ratios and filters out all other ions; and wherein the at least one second AC voltage is applied to electrodes of the first mass filter such that it radially excites ions such that at least some ions having mass to charge ratios above said first range are not transmitted into the second mass filter.

* * * * *